United States Patent [19]
von Bonin et al.

[11] 4,042,558
[45] Aug. 16, 1977

[54] FILLED POLYMERIZATION PRODUCTS BASED ON CARBODIIMIDE COPOLYMERS

[75] Inventors: Wulf von Bonin, Leverkusen; Lothar Preis, Cologne; Ulrich von Gizycki; Manfred Dahm, both of Leverkusen, all of Germany

[73] Assignee: Bayer Aktiengesellschaft, Leverkusen, Germany

[21] Appl. No.: 708,805

[22] Filed: July 26, 1976

[30] Foreign Application Priority Data

Aug. 16, 1975  Germany .............................. 2536493

[51] Int. Cl.$^2$ ..................... C08F 283/04; C08L 79/08; C08L 75/00
[52] U.S. Cl. ........................... 260/37 N; 260/2.5 AK; 260/2.5 BE; 260/2.5 BF; 260/18 TN; 260/77.5 CR; 260/859 R; 428/224; 428/425
[58] Field of Search .................. 260/859 R, 77.5 CR, 260/2.5 BF, 2.5 BE, 37 N

[56] References Cited

U.S. PATENT DOCUMENTS

| 3,748,289 | 7/1973 | Cenker et al. | 260/859 R |
| 3,929,733 | 12/1975 | Alberino et al. | 260/2.5 BF |
| 3,968,089 | 7/1976 | Cuscurida et al. | 260/2.5 BE |
| 3,974,053 | 8/1976 | Nemcek | 260/859 R |

Primary Examiner—H.S. Cockeram
Attorney, Agent, or Firm—Gene Harsh; Lawrence S. Pope; Frederick H. Colen

[57] ABSTRACT

This invention is concerned with polymerizable compositions, a process for producing and polymerizing such compositions and the resultant polymerization product. Compositions comprising the reaction product of polycarbodiimides and $\alpha,\beta$-unsaturated carboxylic acids are dissolved in vinyl monomers and subject to free-radical polymerization. The polymerization product may contain up to about 300 weight percent of conventional fillers.

18 Claims, No Drawings

FILLED POLYMERIZATION PRODUCTS BASED ON CARBODIIMIDE COPOLYMERS

FIELD OF THE INVENTION

This invention relates to novel polymerizable compositions and to polymerization products produced from them. It is distinguished by the fact that reaction products of polycarbodiimides and free-radically polymerizable carboxylic acids are dissolved in vinyl monomer and the resulting solution is subsequently subjected to free-radical polymerization.

BACKGROUND OF THE INVENTION

The difference between the compositions according to the invention and conventional polymerizable compositions based on unsaturated polyesters is that the polymerizable groups to be derived from the $\alpha, \beta$-unsaturated carboxylic acid is not part of a polymeric chain, but instead is a lateral group of such a chain.

The advantage of the process is that it is possible to produce polymerizable compositions of this kind very simply, quickly and sparingly in a one-pot reaction without any need to apply drastic temperature conditions and without any need to use solvents.

Another advantage lies in the considerable range of variation of the process. It enables the properties of the polymerizable compositions and the properties of the polymerization products which are produced from them to be varied within wide limits in terms of functionality and degree of crosslinking. In addition, the wide range of vinyl monomers, but especially the wide range of compounds to be used as $\alpha, \beta$-unsaturated carboxylic acids, coupled with the possibility of using other carboxylic acids, provides for further variation in the properties of the end products.

SUMMARY OF THE INVENTION

It must be regarded as surprising that the polymerizable compositions obtained by the process according to the invention and the polymerization products obtainable from them show high thermal stability under load, although the N-acyl ureas formed from carbodiimides and carboxylic acids normally have low decomposition temperature.

The process according to the invention for the production of polymerization products is distinguished by the fact that solutions of reaction products of polycarbodiimides and free-radically polymerizable carboxylic acids, more especially $\alpha, \beta$-unsaturated carboxylic acids, are subjected to free-radical polymerization in vinyl monomers.

In the context of the invention, solutions are molecularly dispersed and also colloidally disperse solutions. However, they may also be dispersions of particles swollen in the solvent.

DETAILED DESCRIPTION OF THE INVENTION

Polycarbodiimides are compounds which have molecular weights above 300 and which contain at least two carbodiimide groups in the molecule.

Polycarbodiimides of this kind are produced, for example, by intermolecular $CO_2$-elimination from polyfunctional isocyanates preferably catalyzed with pholine oxide groups (or phospholane oxides, sulphides, imides, phospholine sulphides or phospholine imides). In addition to carbodiimide groups, the so-called polycarbodiimides formed may also contain other reactive groups in the molecule, for example optionally terminal isocyanate groups, uretone groups, groups which may be formed by the addition of, for example, isocyanate or carbodiimide, or optionally even $CO_2$, to the chain carbodiimide groups. The co-presence of these groups in the polycarbodiimide molecule is generally governed by the nature and the reaction conditions of the isocyanate of isocyanate mixture used for producing the polycarbodiimide.

Since the polycarbodiimides produced on the basis of polyfunctional isocyanates can of course contain terminal isocyanate groups which have not been converted by reaction, it is best to eliminate these groups by the addition of isocyanate-reactive compounds. It is best to use amines or alcohols for this purpose. In cases where, for example, bifunctional amines or alcohols are used, it is possible to obtain an additional extension of the polycarbodiimide component. Compounds which may be used for eliminating the isocyanate groups are, for example, ammonia, primary and secondary aliphatic, cycloaliphatic and aromatic amines, such as for example methyl amine, diethyl amine, allyl amine, cyclohexyl amine, benezyl amine, aniline, toluidine, ditolyl amine, tolylene diamine, 4,4'-diphenyl methane diamine or, in particular, primary and secondary alcohols such as methanol, ethanol, 2-propanol, butanol, allyl alcohol, hydroxy ethyl acrylate, oleyl alcohol, phenol, polyethers, polyesters, polycarbonates with lateral or terminal OH-groups, water, ethylene glycol, propylene glycol, butane diol, hexane diol, ethanolamine, diethanolamine, triethanolamine, etc. In general, these compounds are added in quantities equivalent to the residual isocyanate groups. However, it is also of interest for special application, for example adhesives, to use smaller quantities, for example from about 0.1 to 0.8 equivalent, whereas larger quantites are rarely advisable because they often result in undesirable plasticization of the polymerization products.

The polycarbodiimides used are preferably produced by subjecting polyfunctional, preferably bifunctional, aliphatic, araliphatic or, in particular, aromatic isocyanates to carbodiimide formation. Monofunctional or trifunctional and higher functional isocyanates may be used as chain terminators or branching agents for the polycarbodiimides, although they should be employed in quantities of less than about 20% by weight and preferably in quantities of less than about 10% by weight of the total quantity of isocyanate.

The following isocyanates, for example, may be used for the required purpose: alkyl isocyanates, such as methyl, allyl, butyl, stearyl isocyanate; alkyl diisocyanates such as ethylene diisocyanate, tetramethylene diisocyanate, hexamethylene diisocyanate, isophorone diisocyanate; aromatic monofunctional and bifunctional isocyanates, such as phenyl isocyanate, phenylene diisocyanates, the isomeric tolylene diisocyanates, diphenyl methane diisocyanates, dimethyl diphenyl methane diisocyanates, and commercial-grade diphenyl methane diisocyanate mixtures which may optionally contain polynuclear diisocyanates or trifunctional isocyanates as well.

Preferred isocyanates are hexamethylene diisocyanate, isophorone diisocyanate, the tolylene diisocyanates and diphenyl methane diisocyanates. The isomers of tolylene diisocyanate are of particular interest.

In principle, it is also possible to use polyfunctional isocyanates of the type obtained by reacting excess diisocyanate with bifunctional or polyfunctional OH-group- or NH-group-containing compounds. Polyfunctional isocyanates of this type are known in polyurethane chemistry either as modified isocyanates or as isocyanate prepolymers. The inclusion of polyisocyanates modified in this way in the process according to the invention enables the process to be further varied, depending upon the chain length selected or upon the chemical nature of the polyfunctional OH- or NH-compound, for example polyethers, polycarbonates or polyesters.

$\alpha, \beta$-Unsaturated carboxylic acids represent particularly suitable radically polymerizable carboxylic acids.

In addition to acrylic acid, methacrylic acid and itaconic acid, suitable $\alpha, \beta$-unsaturated carboxylic acids are, in particular maleic acid and fumaric acid or their semi-amides, preferably their semi-esters. Semiesters and semiamides such as these may readily be obtained by reacting equimolar quantities of maleic anhydride with an alcohol or a primary or secondary amine. Alcohols or amines suitable for this purpose are, for example, ammonia, methyl amine, ethyl amine, cyclohexyl amine, aniline or benzyl amine; methanol ethanol, propanol, isopropanol, allyl alcohol, butanol, isobutanol, hexanol, cyclohexanol, benzyl alcohol, phenol, cresol, isopropyl phenol, isopropenyl phenol, decanol, and synthetic and natural fatty alcohols, such as oleyl alcohol, stearyl alcohol, dedecanol and mixtures of these alcohols. In cases where it is intended to use bifunctional or higher functional semiesters, it is also possible to employ diglycols or polyglycols, such as ethylene glycol or polyethylene glycols, propylene glycol or its polyglycols, butane diol, hexane diol and the corresponding polyethers. However, it is preferred to use alcohols containing from 1 to 18 carbon atoms, such as methanol, ethanol, isopropanol, allyl alcohol, butanol, oleyl alcohol and phenol, especially cyclohexanol.

The reaction between the polycarbodiimides and the $\alpha, \beta$-unsaturated carboxylic acids may be carried out in a solvent which is substantially inert with respect to the polycarbodiimides, such as halogenated hydrocarbon, for example methylene chloride, chloroform, thichlorethylene, perchlorethylene, carbon tetrachloride or benzene, toluene, xylene, ethyl acetate, butyl acetate, dioxane, diethyl ether, methyl glycol acetate, etc. or in the vinyl monomer or vinyl monomer mixture itself.

In one preferred embodiment of the process, not only is the polycarbodiimide directly formed in the vinyl monomer, but the reaction of the polycarboidimide present in this solution with the $\alpha, \beta$-unsaturated carboxylic acid is also carried out in the vinyl monomer. In this way, polycarbodiimide formation, and the reaction with the unsaturated carboxylic acid to form the solution of the reaction products in the vinyl monomer according to the invention may be combined very rationally into a single operation on the lines of a "one-pot process". The resulting solution may then be immediately subjected to polymerization.

In relation to the polycarbodiimide used, the $\alpha, \beta$-unsaturated carboxylic acids are employed in such quantities that at least 1 mole of the $\alpha, \beta$-unsaturated carboxylic acid is used per mole of polycarbodiimide. Since substantially all the $\alpha, \beta$-unsaturated carboxylic acid fractions used are included in polymer formation during the subsequent polymerisation reaction, it is also possible to use considerably more $\alpha, \beta$-unsaturated carboxylic acid, i.e. even considerably more than the amount which corresponds to the equivalent ratio of carbodiimide groups present in the polycarbodiimide present, for example up to 200 mole percent more. However, the quantities of $\alpha, \beta$-unsaturated carboxylic acid which are added to the polycarbodiimide, which corresponds to a molar ratio of about 1, based on the carbodiimide groups present in the polycarbodiimide, are of particular importance to the degree of cross-linking of the resulting polymer. The quantity of $\alpha, \beta$-unsaturated carboxylic acid to be used is best based on the isocyanate content of the quantities of isocyanate used for production of the polycarbodiimides to be used.

Accordingly, about 0.05 to 2 moles and preferably about 0.1 to 1.1 mole of the $\alpha, \beta$-unsaturated carboxylic acids should be used per mole of difunctional isocyanate used, more generally 0.025 to 1 moles, preferably about 0.05 to 0.55 moles per 1 equivalent of isocyanate.

In cases where the quantity of $\alpha, \beta$-unsaturated carboxylic acid used for the reaction with the polycarbodiimide is less than corresponds to equivalence with the carbodiimide groups present in the polycarbodiimide, the reaction product still contains unused reactive sites to which further, for example, non-free-radically polymerisable carboxylic acids can add. In this case, it is possible if desired, further to modify the reaction product by adding acids other than $\alpha, \beta$-unsaturated carboxylic acids. To this end, it is possible to use, either individually or in admixture, for example fatty acids, such as formic acid, acetic acid, propionic acid, butyric acid, crotonic acid, trimethyl acetic acid, palmitic acid, stearic acid, oleic acid, linoleic acid, linolenic acid, ricinoleic acid, erucic acid, tall oil acid or abietic acid, benzoic acid, salicyclic acid, chloroacetic acid, trichloroacetic acid, semiesters of phthalic acid or, in cases where branching or crosslinking of the molecule can be accepted, even dicarboxylic and polycarboxylic acids, such as succinic acid, adipic acid, terephathalic acid or polyesters or polyethers having terminal carboxyl groups.

It is preferred to use fatty acids containing from 2 to 20 carbon atoms, frequently in such quantities that the molar sum of $\alpha, \beta$-unsaturated carboxylic acid used and other carboxylic acid substantially corresponds to the molar sum of the polyfunctional isocyanates used for polycarbodiimide production.

However, this modification of the reaction products used in the process according to the invention is not essential to the process, nor does it have to be carried out to the full extent described, and instead it may of course also be carried out to a lesser extent. It merely represents a possible modification of the process according to the invention.

This modification may best be carried out in the same solvent as the reaction with the $\alpha, \beta$-unsaturated carboxylic acids and may be carried out before, at the same time as or after that reaction.

In all cases, the reaction is carried out at temperatures of from about 5° C to 120° C and preferably at temperatures of from about 10° C to 80° C, advantageously by stirring the carboxylic acids into the dissolved polycarbodiimide introduced beforehand, the reaction beginning immediately and being complete after only a short time. The catalyst component, generally a compound with a phospholine oxide structure, which may still be present from the polycarbodiimide-forming reaction does not cause any problems.

Suitable vinyl compounds include aliphatic or aromatic vinyl monomers of the kind normally used for polymerization purposes. It is preferred to use vinyl monomers which are substantially inert with respect to isocyanate or carbodiimide groups. Vinyl monomers of this kind are, for example, esters of vinyl alcohol or esters to acrylic acid and methacrylic acid, such as vinyl acetate, vinyl propionate, vinyl benzoate or methyl, ethyl, propyl (iso), butyl, cyclohexyl ester, glycol or glycerol esters of (meth) acrylic acid, also (meth) acrylonitrile, (meth) acrylic acid dialkyl amides, vinyl pyrrolidone, vinyl halides such as vinyl chloride, vinylidene chloride, but especially aromatic vinyl compounds such as divinyl benzene, α-methyl styrene, p-chlorostyrene, and most preferably styrene itself.

The quantative ratios of the reaction product of the polycarbodiimide and the α, β-unsaturated carboxylic acid to the vinyl compound in the solution to be polymerized by the process according to the invention are largely determined by the requirement that this solution should still be processible. In other words, it should still be capable of, for example, absorbing fillers, penetrating fiber mats or of being cast, but at least it should be foamable under heat and pressure.

The vinyl monomer should make up from about 5 to 95% by weight and preferably from about 20 to 70% by weight of the weight of the solution.

According to the invention, the free-radical polymerization reaction is initiated by UV-light, ionizing radiation, for example X- or nuclear radiation, preferably by standard free-radical initiators or intiator systems, which may be added to the solution of the reaction product in the vinyl monomer either completely or in part during its actual preparation or even immediately before polymerization, at temperatures of from about −25° to +280° C and preferably at temperatures of from about +10° to +130° C.

Initiators such as these are, for example, peroxides such as lauroyl peroxide, dibenzoyl peroxide, t-butyl hydroperoxide, di-t-butyl peroxide, dicumyl peroxide, cyclohexanone peroxide, t-butyl peroctoate or combinations of these peroxides with reducing agents or co-activators such as, for example, boroalkylene, $SO_2$-donors or amines, for example p-dimethyl amino toluene, or metal salts such as cobalt naphthenate. Azo compounds, such as azodiisobutyronitrile or azodiisobutyric acid diethyl ester, are also very suitable. In many cases, the polymerization reaction may be initiated solely by applying elevated temperature, i.e. thermally.

The polymerization initiators are used in quantities of from about 0.01 to 3%, and preferably in quantities of from about 0.1 to 1% based on the weight of the solution.

Since a considerable amount of heat may be liberated during the polymerization reaction according to the invention and also in order to adapt shrinkage and, optionally, mechanical properties to the particular application envisaged, it is often advantageous to add to the solutions to be polymerized in accordance with the invention fillers, for example, in powder form or in the form of fibers, crystal needles, flakes, beads or small hollow bodies. Fillers such as these are well known in the art and include, for example, chalk, calcium oxide, calcium hydroxide, quartz powder, glass beads, talcum, graphite, carbon blacks, polymer powders, for example based on polyethylene, polypropylene, polymethyl methacrylate, polystyrene, polyvinyl acetate, glass fibers, potassium titanate, gypsum, carbon fibers, steel fibers, metal powders, gas bubbles, water droplets, hollow glass beads, etc. These fillers may optionally be used in quantities of up to about 300%, based on the weight of the solution. The quantity in which the fillers are used by no means specific to the process. It is, of course, also possible to introduce dyes, processing aids, for example emulsifiers, thickeners, odorants, etc.

The optionally more or less heavily filled or even non-filled solutions to be polymerized in accordance with the invention may in principle be processed by any of the technologies normally used for processing unsaturated polyester resins, i.e. for example, as cast resins, as composites with glass fibers (mats) and other reinforcing materials, as molding compounds, injection molding compounds or foam or foamed binders for lightweight concretes.

The polymerization products are used for the production of supports for electronic circuit elements, as insulators, casting compounds, for the production of foam articles, hollow bodies and heat shields. They may also be used for coating or impregnating wood, cardboard, textiles of nonwovens or as binders for organic-inorganic concretes. They may also be used as adhesives.

The process is illustrated by but by no means limited to the following Examples, in which the parts quoted are parts by weight unless otherwise stated.

EXAMPLE 1

170 parts (approximately 2 moles) of commercial-grade tolylene diisocyanate and 1.0 part of 1-methyl-1-oxophospholine are dissolved in 1000 parts of methylene chloride. The evolution of $CO_2$ begins immediately. After it has abated somewhat, the solution is heated to reflux temperature. After about 1 hour, there is no further evolution of gas to be observed. The polycarbodiimide formed has a molecular weight of approximately 2600, as determined osmotically in toluene. 300 parts (approximately 1.5 moles) of maleic acid cyclohexyl semiester are then added to the polycarbodiimide solution obtained. The mixture is stirred until a solution is formed and the solution thus formed is stirred for about another 3 hours during which it undergoes a slight increase in temperature and becomes reddish in color.

220 parts of styrene (approximately 2 moles) are then added and the methylene chloride is distilled off on a rotary evaporator. The residual styrene solution of the addition product of the maleic acid semiester with the polycarbodiimide is now ready for use. A sample is mixed with 1% by weight of t-butyl peroctoate and it polymerizes at 90° C to form a highly crosslinked solid resin.

EXAMPLE 2

90 parts (approximately 1 mole) of methacrylic acid dissolved in 250 parts (approximately 1.5 moles) of cyclohexyl methacrylate are slowly added at approximately 35° C to a polycarbodiimide solution produced in accordance with Example 1. The methylene chloride is then distilled off. The solution obtained polymerized at 70° C to form a brittle resin following the addition of 0.8% by weight of azodiisobutyronitrile. The same result is obtained where acrylic acid is used instead of methacrylic acid.

EXAMPLE 3

The polycarbodiimide solution produced in accordance with Example 1 is reacted with 150 parts (approximately 1 mole) of maleic acid-n-butyl semiester, followed by the addition of 110 parts (approximately 1 mole) of styrene. The methylene chloride is then removed. Approximately 1% by weight of azodiisobutyric acid ethyl ester is then dissolved in the resulting viscous solution. A glass fiber mat is then impregnated with this solution and hardened in a press for 10 minutes at 120° C. The panel obtained is suitable for use as a support for electrical circuits.

EXAMPLE 4

A polycarbodiimide solution prepared in accordance with Example 1 is reacted with 400 parts (approximately 2 moles) of maleic acid cyclohexyl semiester and then dried in a spray dryer. The resulting powder is then dissolved to form an approximately 60% by weight solution in methyl methacrylate, followed by the addition of 1% by weight of dibenzoyl peroxide. This solution is applied between two freshly sand-blasted steel plates and hardened in a press at 100° C. The steel plates are now firmly bonded to one another. They can only be separated from one another at a temperature about 250° C.

The same result is obtained when styrene is used instead of methyl methacrylate.

EXAMPLE 5

A polycarbodiimide solution obtained in accordance with Example 1 is reacted with 200 parts (approximately 1 mole) of maleic acid ethyl semiester, after which 200 parts (approximately 0.70 mole) of oleic acid are added, followed by boiling under reflux for 5 hours. 140 parts (approximately 1.3 moles) of styrene are then added and the methylene chloride is distilled off. An asbestos cement panel is coated with the resulting solution, to which 0.5% by weight of azodiisobutyronitrile and 0.5% by weight of t-butyl peroctoate are added, and the solution is hardened under nitrogen at approximately 95° C. The glossy coating obtained has water-repellent properties.

EXAMPLE 6

10 parts (0.04 mole) of 4,4'-diphenyl methane diisocyanate are dissolved in 90 parts of styrene. 0.2 parts of 1-phenyl-3-methyl-1-oxophospholine are then added, followed by stirring for 5 hours at 80° C. A slightly hazy, viscous polycarbodiimide solution is formed. 8 parts (0.04 mole) of maleic acid cyclohexyl semiester and 1 parts of azodiisobutyronitrile are then stirred into the resulting solution at approximately 40° C. After about 30 minutes, the solution obtained is poured into a panel mold (panel thickness approximately 5mm) and hardened at 70° C. A panel insoluble in the normal solvents for polystyrene is obtained.

EXAMPLE 7

87 parts (approximately 0.5 mole) of tolylene diisocyanate (approximately 80% by weight of 2,4-isomer and approximately 20% by weight of 2,6-isomer) are dissolved in 110 parts of styrene. Following the addition of 0.5 parts of 1-methyl-1-oxophospholine, the solution is stirred for 1 hour at 40° C and then for 1 hour at 80° C. A viscous polycarbodiimide solution is formed. 100 parts of maleic acid cyclohexyl semiester (approximately 1 mole) are introduced into this solution at a temperature of 25° C. A viscous solution of the addition product is formed which is ready for use after stirring for 1 hour.

A. 1% by weight azodiisobutyronitrile is dissolved in the solution and the solution thus activated is used for impregnating a bundle of glass fibers wound into the shape of a tube. The tube is then hardened at 80° C.

B. 2 parts of p-dimethyl aminotoluene and 2 parts of dibenzoyl peroxide are dissolved in the solution, after which 3 parts of pyrocarbonic acid diethyl ester are quickly stirred in and the mixture is introduced into a box mold. The mixture begins to foam in this mold with decomposition of the pyrocarbonic acid ester, and subsequently gels. After hardening, a foamed tough and hard material with a unit weight of approximately 200 g/l is obtained.

C. 100 parts of the solution activated in accordance with 7 A) are mixed with 50 parts of hollow glass microbeads and hardened in a box mold at 90° C. A solvent-resistant syntactic foam is obtained.

D. 100 parts of the solution activated in accordance with 7 A) are processed with 150 parts of quartz powder to form a paste. The paste is molded in a press to form cylindrical spools, hardened at 110° C and then tempered for 4 hours at 280° C.

EXAMPLE 8

168 parts of hexamethylene diisocyanate (approximately 1 mole) are dissolved in 200 parts of styrene. 3.2 parts of 1-methyl-1-oxophospholine are then added, followed by heating to 120° C. A viscous solution is formed after about 2 hours. 15 parts (approximately 0.2 mole) of acrylic acid are slowly introduced into this solution at 40° C, followed by the introduction of 20 parts of acetic acid (approximately 0.5 mole). After stirring for 1 hour, 4 parts of cyclohexanone peroxide and 4 parts of azodiisobutyric acid ethyl ester are added at 20° C. A panel mold is filled with the solution thus obtained. This is followed by hardening for 2 hours at 60° C, for 2 hours at 80° C and then for another 2 hours at 120° C. A clear, tough polymer panel which is not dissolved in toluene or ethyl acetate is obtained.

EXAMPLE 9

170 parts of tolylene diisocyanate (approximately 1 mole) are dissolved in 500 parts of methylene chloride. 1.0 part of 1-methyl-1-oxophospholine is then added, followed by boiling under reflux for about 3 hours during which the carbodiimide-forming reaction takes place accompanied by the elimination of $CO_2$. 20 parts (approximately 0.1 mole) of maleic acid cyclohexyl semiester are then added and the methylene chloride is distilled off following the addition of 0.1 part of thionyl chloride (to deactivate the phospholine oxide). The reaction product left behind is dried in vacuo at 40° C, and it is soluble in styrene. The finely powdered reaction product (50 parts) is then stirred into a standard commercial-grade UP resin (100 parts), resulting in the formation of a dough-like homogeneous mass. The UP-resin is an approximately 60% styrene solution of a co-condensate of maleic acid, phthalic acid and 1,2-propylene glycol with an acid number of approximately 60, so that the carboxyl groups of this resin can also react with the polycarbodiimide.

1.5 parts of benzoyl peroxide are worked into the doughy mass obtained which is then hardened for 50 minutes at 120° C inside a panel mold in a press. The hard elastic panel obtained in this way is suitable for use as a material for covering fuse boxes.

EXAMPLE 10

Following the addition of 2 parts of 1-methyl-1-oxophospholine, 170 parts of tolylene diisocyanate and 200 parts of maleic acid cyclohexyl semiester are stirred at 60° C into 400 parts of styrene until a honey-like consistency is obtained with evolution of $CO_2$ (approximately 2.5 hours). After cooling to room temperature, 8 parts of t-butyl peroctoate are added and a glass fiber mat is impregnated with the resin. The glass fiber mat thus impregnated is hardened in a press for 10 minutes at 30 atms/130° C and may then be used as a support for electrical circuits.

EXAMPLE 11

A solution of 2% by weight of 1-methyl-1-oxophospholine in 4,4'-diphenyl methane diisocyanate is kept at 80° C until a solid foamy mass is formed. After about 40 hours, this mass if finely powdered in a ball mill.

100 parts of this powder are stirred with a solution of 1.5 parts of t-butyl peroctoate and 15 parts of maleic acid cyclohexyl semiester in 35 parts of styrene to form a dough, the carbodiimide powder reacting with the semiester and at the same time being swollen by the styrene.

This dough is poured into a beaker mold which it fills to a level of approximately 30% by volume. This is followed by heating for 2 hours to 100° C, during which the mass polymerizes and foams into a tough, hard foam body which retains its shape, even at 300° C. When the foam is ignited, it only burns slowly with heavy charring of the foam skeleton.

Although the invention has been described in detail for the purpose of illustration, it is to be understood that variations can be made by those skilled in the art without departing from the spirit and scope of the invention except as it may be limited by the claims.

What is claimed is:

1. A process for the production of polymerization products comprising subjecting solutions of the reaction products of polycarbodiimides and α, β-unsaturated carboxylic acids in about 5 to 95 weight percent vinyl monomers to free-radical polymerization.

2. The process of claim 1, wherein the polycarbodiimides are formed in situ in the vinyl monomer.

3. The process of claim 1, wherein the reaction products of polycarbodiimides and α, β-unsaturated carboxylic acids are prepared in situ in the vinyl monomer.

4. The process of claim 1, wherein the polycarbodiimides or their reaction products with the α, β-unsaturated carboxylic acids are dissolved in the form of prepared compounds in the vinyl monomer.

5. The process of claim 1 wherein in addition to α, β-unsaturated carboxylic acids, non-free-radically polymerizable carboxylic acids are also reacted with the polycarbodiimides.

6. The process of claim 1, wherein the polycarbodiimides used are obtained by the intermolecular elimination of $CO_2$ from isocyanates.

7. The process of claim 6, wherein polycarbodiimides based on aromatic diisocyanates are used.

8. The process of claim 6, wherein polycarbodiimides based on (cyclo)aliphatic diisocyanates are used.

9. The process of claim 1 wherein (meth)acrylic acid is used as the α, β-unsaturated carboxylic acid.

10. The process of claim 1, wherein fumaric acid or maleic acid semiesters are used as the α, β-unsaturated carboxylic acids.

11. The process of claim 1, wherein aromatic vinyl compounds are used as the vinyl monomers.

12. The process of claim 1, wherein (meth)acrylic acid esters are used as the vinyl monomers.

13. The product of the process of claim 1.

14. A process for the production of polymerization products comprising:
    a. reacting polyisocyanates in the presence of carbodiimide formation catalysts to form polycarbodiimides with molecular weights greater than 300 and containing at least 2 carbodiimide groups per molecule,
    b. reacting said polycarbodiimide with between about 0.05 and 2 moles of α, β-unsaturated carboxylic acids per mole of said polyisocyanates used to form said polycarbodiimide at a temperature of about 5° to 120° C, such that there is at least one mole of said acid for each mole of polycarbodiimide, and
    c. free-radically polymerizing said polycarbodiimide carboxylic reaction product in a solution containing about 5 to 95 weight percent of a vinyl monomer at a temperature between about −25° and 280° C.

15. A polymerization product comprising the free-radical polymerization product of:
    1. the reaction product of a polycarbodiimide having a molecular weight of at least 300 and containing at least two carbodiimide groups per molecule with at least one mole of an α, β-unsaturated carboxylic acid per mole of said polycarbodiimide with
    2. 5 to 95 weight percent of a vinyl monomer.

16. The polymerization product of claim 15 which contains up to 300 weight percent of fillers.

17. The polymerization product of claim 16, wherein the filler is selected from the group consisting of chalk, calcium oxide, calcium hydroxide, quartz powder, glass beads, talcum, graphite, carbon blacks, glass fibers, potassium titanate, gypsum, carbon fibers, steel fibers, metal powders, polymer powders, water droplets and hollow glass beads.

18. A polymerizable composition comprising
    1. the reaction product of a polycarbodiimide having a molecular weight of at least 300 and containing at least two carbodiimide groups per molecule with at least one mole of an α, β-unsaturated carboxylic acid per mole of polycarbodiimide, and
    2. 5 to 95 weight percent of a vinyl monomer.

* * * * *